US009311202B2

(12) United States Patent
Wang et al.

(10) Patent No.: US 9,311,202 B2
(45) Date of Patent: Apr. 12, 2016

(54) NETWORK PROCESSOR ONLINE LOGIC TEST

(71) Applicant: Futurewei Technologies, Inc., Plano, TX (US)

(72) Inventors: Zhiyuan Wang, Fremont, CA (US); Xinli Gu, Sunnyvale, CA (US); Yufang Sun, Beijing (CN); Xiaoyi Su, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 216 days.

(21) Appl. No.: 13/729,935

(22) Filed: Dec. 28, 2012

(65) Prior Publication Data

US 2014/0122928 A1    May 1, 2014

Related U.S. Application Data

(60) Provisional application No. 61/721,373, filed on Nov. 1, 2012.

(51) Int. Cl.
*G06F 11/00* (2006.01)
*G06F 11/263* (2006.01)
*H04L 12/26* (2006.01)

(52) U.S. Cl.
CPC ............... *G06F 11/263* (2013.01); *H04L 43/50* (2013.01)

(58) Field of Classification Search
CPC ... G06F 11/2294; G06F 11/079; G06F 11/22; G06F 11/2236; G06F 11/0748; G06F 11/261; G06F 11/263; H04L 43/50
USPC ..................................................... 714/25, 27
See application file for complete search history.

(56) References Cited

U.S. PATENT DOCUMENTS 3,876,987 A * 4/1975 Dalton et al. ................... 714/10

9,152,518 B2 * 10/2015 Busaba ................... G06F 11/24
(Continued)

FOREIGN PATENT DOCUMENTS

| CN | 101719088 A | 6/2010 |
| CN | 102103535 A | 6/2011 |

OTHER PUBLICATIONS wikipedia, "Multi-core processor" page, retrieved via the way back machine, from https://web.archive.org/web/20120917184646/https://en.wikipedia.org/wiki/Multi-core_(computing)#Software_impact, published Sep. 17, 2012.*
Scheduling (computing) page of wikipedia using the way-back-machine from Oct. 15, 2011, reteriveed from http://web.archive.org/web/20111015071517/http://en.wikipedia.org/wiki/Scheduling_(computing).*

(Continued)

*Primary Examiner* — Yair Leibovich
(74) *Attorney, Agent, or Firm* — Conley Rose, P.C.; Grant Rodolph; William H. Dietrich (57) ABSTRACT

A method of testing a multi-core network processor comprises placing the multi-core network processor in an online environment. A test is performed on a core of the multi-core network processor when the core is idle, and the core is released from the test when it is completed and resumes processing data in the online environment. In another embodiment, a network processor comprises a computer readable instructions module and a processing core. The computer readable instructions module is configured to store test instructions, and the processing core is configured to operate in an online environment and execute the test instructions to test the processing core when the processing core is idle. In yet another embodiment, an apparatus comprises a multi-core network processor that is configured to execute test instructions to perform a test on a core of the multi-core network processor when the core is idle.

19 Claims, 7 Drawing Sheets

(56) References Cited

U.S. PATENT DOCUMENTS

| | | | |
|---|---|---|---|
| 2005/0229019 A1* | 10/2005 | Azevedo et al. | 714/2 |
| 2007/0079188 A1* | 4/2007 | Veendrick | G01R 31/30 714/724 |
| 2009/0241124 A1* | 9/2009 | Denneau et al. | 718/105 |
| 2010/0192012 A1* | 7/2010 | Parulkar | 714/24 |
| 2015/0106571 A1* | 4/2015 | Bernard | G06F 12/0817 711/145 |
| 2015/0281990 A1* | 10/2015 | Kelley | H04W 24/10 370/241 |

OTHER PUBLICATIONS

Foreign Communication From A Counterpart Application, PCT Application No. PCT/CN2013/086418, International Search Report dated Jan. 23, 2014, 6 pages.

Foreign Communication From A Counterpart Application, PCT Application No. PCT/CN2013/086418, Written Opinion dated Jan. 23, 2014, 4 pages.

* cited by examiner

NETWORK PROCESSOR ONLINE LOGIC TEST

CROSS-REFERENCE TO RELATED APPLICATION

The present application claims priority to U.S. Provisional Patent Application No. 61/721,373 filed Nov. 1, 2012 by Zhiyuan Wang et al. and entitled "NP Online Logic Test," which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network processors commonly include multiple central processing units known as "cores." Each core is able to independently read and execute computer readable instructions, and the multiple cores are able to operate simultaneously. Accordingly, multi-core network processors may increase processor performance by being able to read and execute multiple computer readable instructions at the same time.

Additionally, network processors may also include multi-threading capabilities, which can further increase processor performance. In multithreading, computing processes and tasks are broken down into smaller units of computer readable instructions known as "threads." At least some of the threads may be processed in parallel, which enables a process or task to be completed in a shorter amount of time.

Network processors (e.g., multi-core network processors with multithreading) may be tested to check for defects. One type of test is an automated test pattern generation (ATPG) test. In ATPG testing, network processors are tested by automatic test equipment (ATE) that applies an automatic test pattern to a network processor and checks its response. The test response is compared to the response that is expected if the network processor is functioning normally. Differences between the test response and the expected response can indicate that the network processor is not functioning normally and that there may be a defect.

SUMMARY

In one embodiment, the disclosure includes a method of testing a multi-core network processor. The multi-core network processor is placed in an online environment, and a test is performed on a core of the multi-core network processor when the core is idle. The core is released from the test when the test is completed, and the core resumes processing data in the online environment.

In another embodiment, the disclosure includes a network processor having a computer readable instructions module and a processing core. The computer readable instructions module is configured to store test instructions. The processing core is configured to operate in an online environment and execute the test instructions to test the processing core when the processing core is idle.

In yet another embodiment, the disclosure includes an apparatus comprising a computer executable instructions module and a multi-core network processor. The computer executable instructions module is configured to store test instructions, and the multi-core network processor is configured to load the test instructions to the multi-core network processor. The multi-core network processor is further configured to operate in an online environment, and execute the test instructions to perform a test on a core of the multi-core network processor based at least in part on a determination that the core is idle. The core is returned to the online environment after the test has been completed.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

Disclosed herein are systems and methods that use an online logic test to test a network processor. In one embodiment, a multi-core network processor is placed in an online environment (e.g., it is connected to a system and is in operation). When one of the cores becomes idle, a logic test is applied to the core to check whether or not it is operating correctly. After the test is completed, the core is released and is able to resume processing other instructions from the system. The other cores may similarly be tested as they become available (e.g., when the cores are idle). Additionally, the testing may be repeated periodically to ensure continued correct operation of the network processor.

The logic test can be configured to check any portion of a core. In certain embodiments, portions of a core that have a high risk of failure and/or portions of a core that are not fully tested in an offline test (e.g., in an ATPG test) are targeted for testing. For example, in one embodiment, a core's register array, read/write circuitry, and/or logic circuitry are tested. Furthermore, the logic test can use the same functional mode commands (e.g., the same read and write commands) that are used by the core during normal operations in an online environment.

In light of the above, embodiments of the present disclosure may be advantageous in that they enable a network processor to be tested online without impacting the system performance. This is accomplished at least in part by testing each core as it becomes available and is not being used by the system. The online testing can reduce test costs by not requiring any additional equipment for testing (e.g., automatic test equipment). Additionally, the online testing can test portions of a core that may not be fully tested in an offline test (e.g. in an ATPG test), thereby improving test coverage and enhancing the ability to find defects that may affect system performance. Furthermore, since the testing can be performed online, the testing can be periodically repeated to ensure continued correct operation of the network processor and detect potential aging issues that may result in a system failure. These and other features and benefits of embodiments are described below and shown in the accompanying figures.

Figure 1:
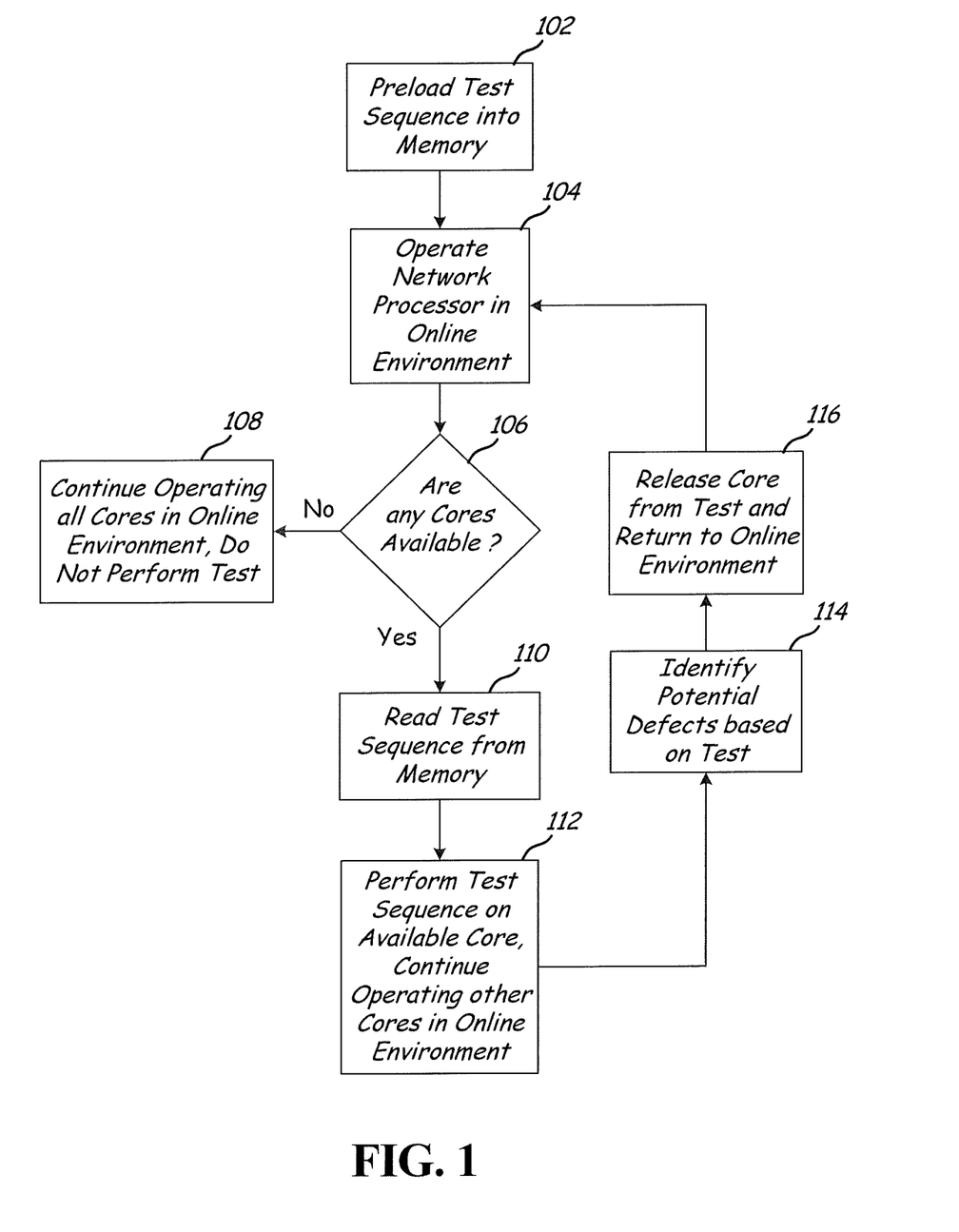
FIG. 1 is a flowchart of an embodiment of a method of performing a network processor online logic test.

FIG. 1 is a flowchart of a method of performing a network processor online logic test. At block 102, a test sequence is preloaded into a system memory. The test sequence can identify a portion of the core to be tested, a test pattern to use during the test, functions to use during the test, or any other information that may be useful to test the core. At block 104, a network processor is placed into and operated in an online environment. For instance, the network processor can be incorporated within a system board and can be used to process instructions from other components of the system. At block 106, the system determines whether any of the network processor's cores are idle. If all of the cores are currently being used, then the method continues to block 108 where all of the cores continue to be operated normally in the online environment and no testing is performed. If a core is available (i.e., idle), then the method continues to block 110 where the test instructions that were preloaded into the system memory are read.

At block 112, the online logic test is performed on the available core by executing the test sequence while the other cores continue to operate normally in the online environment. At block 114, the results of the test are analyzed to determine whether any potential defects were detected. If any potential defects were detected, the system may optionally log the data and/or provide an alert that warns the system or an operator that there may be an issue with the core (e.g., an alert that the core is malfunctioning). The core is then released from the test and is returned to normal operations in the online environment at block 116 (e.g., the core is released from the test and is able to resume processing data from other components in the online environment when the test is completed). The method shown in FIG. 1 can be repeated to test the other cores in the network processor as they become available, and all of the network cores can be periodically retested as desired to ensure continued correct operation of the network processor and to detect any potential aging defects.

Figure 2:
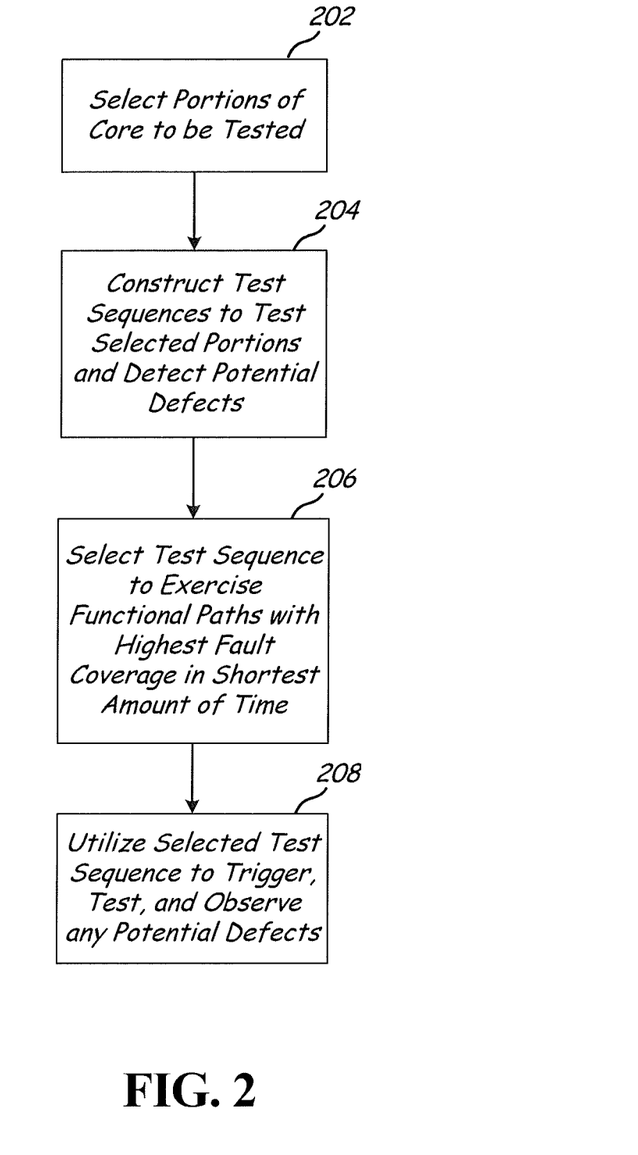
FIG. 2 is a flowchart of an embodiment of a method of generating and using test instructions for performing a network processor online logic test.

FIG. 2 is a flowchart of a method of generating and using test instructions for performing a network processor online logic test. At block 202, the components of the network processor that are to be tested are selected. In an embodiment, the components that are selected include components that have a high risk of failure, components that would cause a system malfunction, components that have not previously been tested, and/or components that have not been fully tested. For instance, an ATPG test performed on the network processor before being incorporated into the system may have low test coverage for certain portions of the core. Those portions can be selected at block 202 to ensure that they are more extensively tested. For example, a register array of a core and its associated read/write and logic circuitry may not be fully tested during an ATPG test. These portions can be selected for testing during the network processor online logic test.

At block 204, one or more test sequences are constructed that test the selected components to detect potential defects. The test sequences can include indications of the components of the core to be tested, a test pattern to use during the test, functions to use during the test, diagnostic tools to detect and identify potential defects and failures, or any other information that may be useful in performing the test.

At block 206, a test sequence to be used for testing is selected. Some factors that may optionally be considered in selecting the test sequence include test time and test coverage. For example, it may be desirable to select the test sequence that can be performed in the shortest amount of time to reduce any potential impact of the testing on system performance. Also for example, it may be desirable to select the test sequence that provides high test coverage for the components to be tested to ensure that the components are thoroughly tested.

At block 208, the selected test sequence is used by a network processor in an online environment to trigger, test, and observe any potential defects. For instance, the selected test sequence can be used as the test sequence in blocks 102 and 110 in FIG. 1. The method in FIG. 2 may then be repeated to identify other components to be tested and to generate test sequences for those other components.

Figure 3:
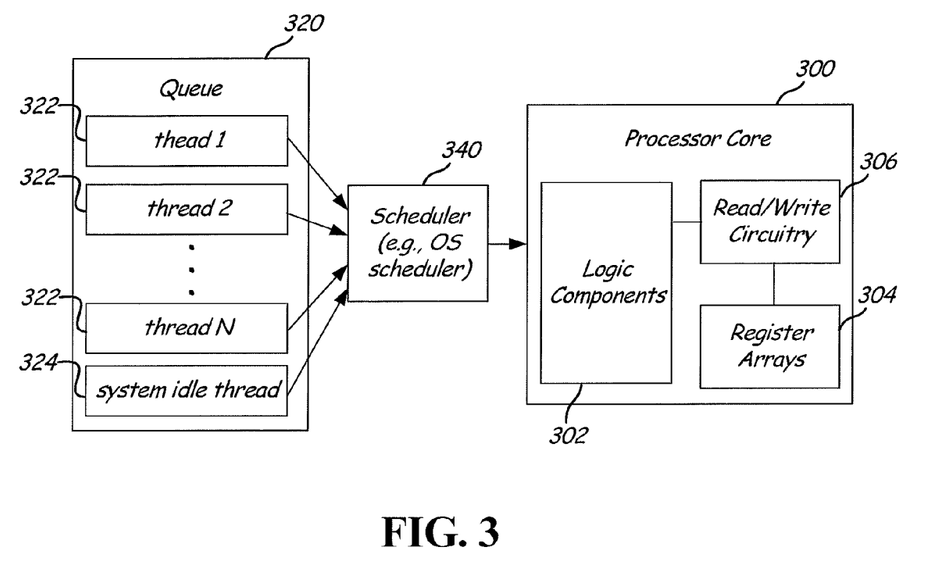
FIG. 3 is a schematic diagram of an embodiment of an operating environment of a network processor that is configured to perform an online logic test.

FIG. 3 is a schematic diagram of an operating environment of a multithreading processor core 300 that is configured to perform an online logic test. In an embodiment, a network processor that is configured to perform an online logic test has multiple cores such as the one shown in FIG. 3, and each of the cores can be tested using the online logic test. Embodiments of the present disclosure are not however limited to any particular core or operating environment and may be practiced with cores and in environments different than the specific examples shown in FIG. 3.

Multithreading processor core 300 includes logic components 302, a register array 304, and read/write circuitry 306. Logic components 302 perform logic functions and process data for core 300, and register array 304 is a temporary storage area that holds data for logic components 302. Read/write circuitry 306 provides transmission paths and other components needed for logic components 302 to read data from and write data to register array 304.

In an embodiment, a queue 320 stores threads 322 that are to be processed by core 300, and a scheduler 340 (e.g., an operating system scheduler) determines which thread 322 is given access to core 300. For instance, scheduler 340 may assign priority levels to threads 322 and may determine which thread 322 is given access based on the priority levels.

FIG. 3 also shows that queue 320 includes a system idle thread 324. In an embodiment, system idle thread 324 can be used by scheduler 340 and core 300 when no other threads 322 are available to be processed by core 300. For example, core 300 may have completed processing all of the threads 322 and no new threads have entered queue 320. Accordingly, system idle thread 324 is used to ensure that core 300 will always have a thread to run.

In an embodiment, system idle thread 324 can be used to perform an online logic test for core 300. For instance, when system idle thread 324 is used by core 300, system idle thread 324 can call for an online logic test to be performed on core 300. Alternatively, system idle thread 324 may itself include instructions to perform the online logic test such that when it is used by core 300, the online logic test is performed. In yet another embodiment, a system can monitor the usage of system idle thread 324 and can trigger an online logic test for core 300 when system idle thread 324 is being used. Embodiments are again however not limited to any specific implementation, and embodiments can be used on multithreading cores in configurations differing from the ones described above.

Figure 4:
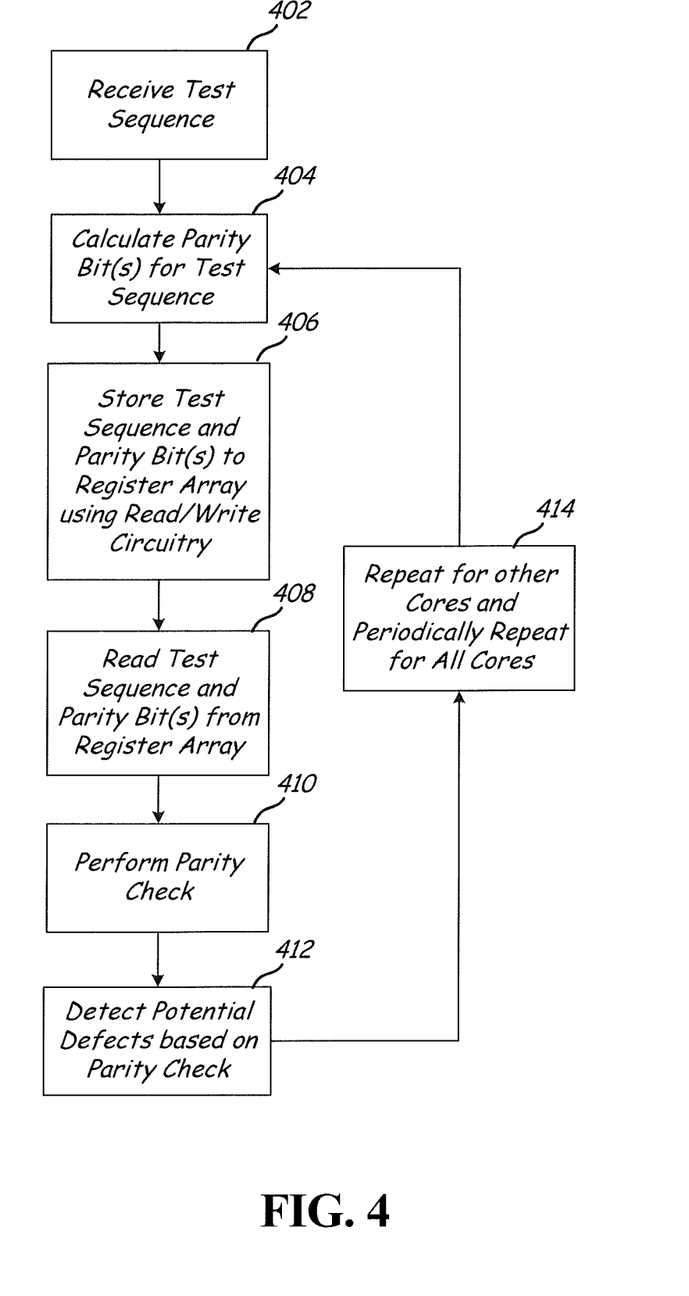
FIG. 4 is a flowchart of an embodiment of a method of performing a network processor online logic test to test a register array and associated read/write circuitry.

FIG. 4 is a flowchart of another method of performing a network processor online logic test. More specifically, the method in FIG. 4 tests a core register array and associated read/write circuitry. The method shown in FIG. 4 can be used for instance in an operating environment such as the one shown in FIG. 3. Embodiments however are not limited to any specific operating environment and can be used in other systems.

At block 402, a test sequence is received. As previously mentioned, a test sequence can identify a portion of the core to be tested, a test pattern to use during the test, functions to use during the test, or any other information that may be useful to test the core. In one embodiment, the test sequence includes a test pattern having a sequence of bits (e.g., a sequence of logical 0 and logical 1 values) that can be stored to the register array.

At block 404, one or more parity bits are calculated for the test sequence. For instance, in one embodiment, a test sequence includes 32 bits that are partitioned into 4 groups of 8 bits. A parity bit is generated for each group of 8 bits such that a total of 4 parity bits are generated for the 32 bit test sequence. The parity bits can be determined using either an even parity configuration or an odd parity configuration. When using an even parity configuration, the parity bit is set to 1 if the number of ones in a given set of bits is odd, and the parity bit is set to 0 if the number of ones in the given set of bits is even. When using an odd parity configuration, the parity bit is set to 1 if the number of ones in a given set of bits is even, and the parity bit is set to 0 if the number of ones in a given set of bits is odd.

At block 406, the test sequence and the parity bits are stored to a register array of a core. The test sequence and the parity bits are optionally stored to the register array using the same read/write circuitry and paths that are used to store data to the register array when operating the core in a functional mode. Accordingly, the test results can be better correlated to functional performance, and the test checks functional read/write paths that may not be tested during a structural test such as during an ATPG test.

At block 408, a test sequence and parity bits are read back from the register array. Again, the same read/write circuitry and paths that are used to read data from the register array in a functional mode are optionally used to read the data. In an embodiment, the test sequence and parity bits read back at block 408 correspond to the test sequence and parity bits stored at block 406. For example, if there are no defects in the system, the test sequence and parity bits read back at block 408 should be the same as the test sequence and parity bits stored at block 406. However, if there is a defect in the system (e.g., a defect in the register array, read/write circuitry, etc.), then the test sequence and parity bits read back at block 408 may be different than the test sequence and parity bits stored at block 406.

At block 410, a parity check is performed using the test sequence and the parity bits read from the register array. For instance, in the example described above in which the test sequence includes 32 bits that are partitioned into 4 groups of 8 bits, a parity check may be performed for each of the 4 groups using the 4 parity bits. If an even parity configuration is used, the number of ones in the entire set of bits (i.e., the number of ones in both the test sequence and its parity bit) should be even if everything is functioning correctly. If an odd parity configuration is used, the number of ones in the entire set of bits (i.e., the number of ones in both the test sequence and its parity bit) should be odd if everything is functioning correctly.

At block 412, the parity check performed at block 410 is used to determine whether any defects may exist. For instance, if any of the parity checks fail (e.g., if the even parity configuration is used and the number of ones is odd, or if the odd parity configuration is used and the number of ones is even), then a defect may exist somewhere within the system. For example, a defect could exist on the circuitry used to store the data, a defect could exist in the register array, or a defect could exist on the circuitry used to read the data. However, if the parity checks pass (e.g., if the even parity configuration is used and the number of ones is even, or if the odd parity configuration is used and the number of ones is odd), then this indicates that the register array and its read/write circuitry are operating correctly.

At block 414, the method shown in FIG. 4 is optionally repeated for the other cores in the network processor and is periodically repeated for all of the cores. Accordingly, the method can be used to ensure continued correct operations of the core and can detect any potential aging defects.

Figure 5:
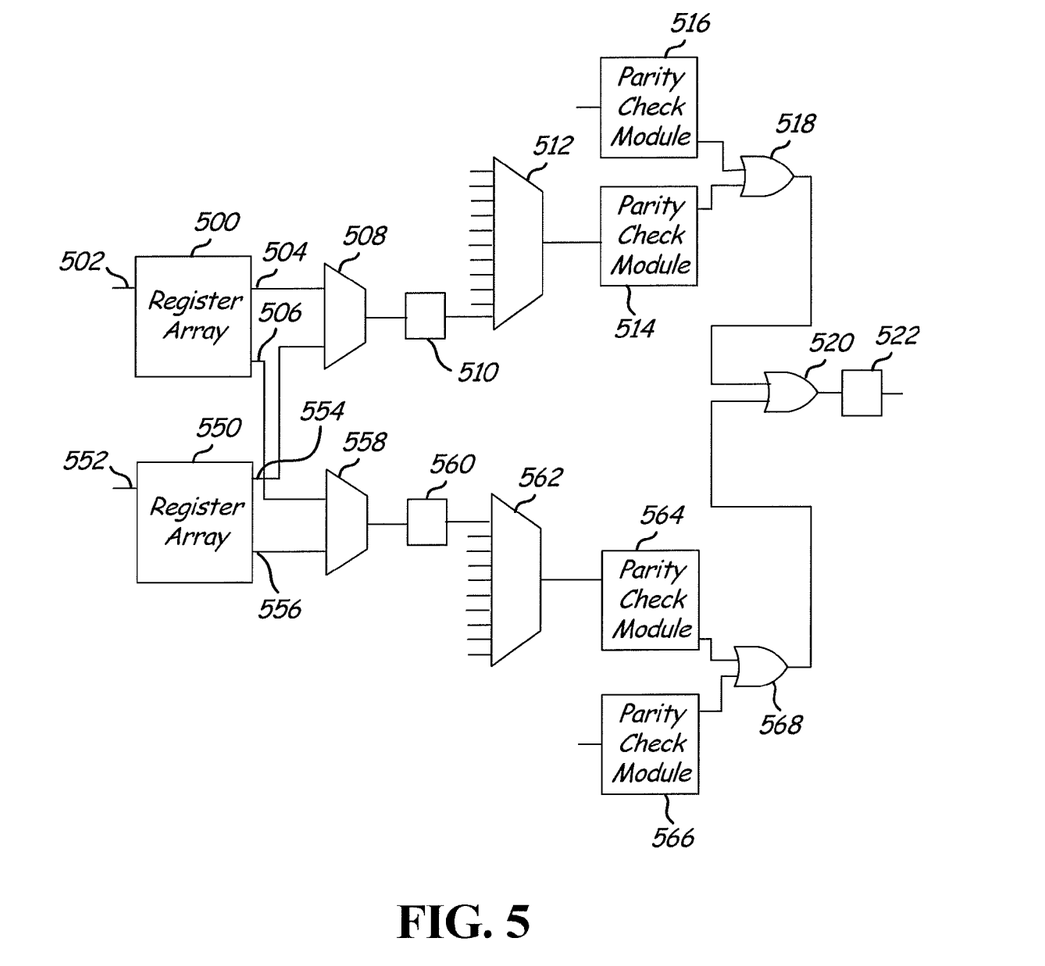
FIG. 5 is a schematic diagram of an embodiment of register arrays and read/write circuitry of a network processor core.

FIG. 5 is a schematic diagram of a core's register arrays and read/write circuitry that can be tested using the method shown in FIG. 4. The specific configuration of register arrays and read/write circuitry shown in FIG. 5 is given for illustration purposes only, and embodiments of the present disclosure are not limited to any particular configuration. Additionally, it should be noted that the specific configuration in FIG. 5 has been simplified to enhance clarity. For example, FIG. 5 only illustrates two register arrays 500 and 550. A core may include any number of register arrays and any other additional circuitry.

Register arrays 500 and 550 can be configured to store any amount of data (e.g., bits). For instance, in an embodiment in which a test sequence includes 32 bits and 4 parity bits are calculated for the 32 bits, the register arrays 500 and 550 can be configured to store 36 bits. Data is stored to array 500 using port 502, and data is stored to array 550 using port 552. Additionally, each register array optionally includes two ports for reading data from the register array. Register array 500 includes two reading ports 504 and 506, and register array 550 includes two reading ports 554 and 556.

The reading ports 504 and 554 are connected to a multiplexer 508, and the reading ports 506 and 556 are connected to a multiplexer 558. Accordingly, each of multiplexers 508 and 558 can selectively read data from either register array 500 or register array 550. Outputs from multiplexers 508 and 558 are optionally connected to flip-flops 510 and 560, respectively. Flip-flops 510 and 560 can be configured to store data read from register arrays 500 and 550.

Outputs from flip-flops 510 and 560 are connected to multiplexers 512 and 562, respectively. As shown in FIG. 5, multiplexers 512 and 562 may have many input lines. The additional input lines can be used to connect multiplexers 512 and 562 to additional register arrays such that multiplexers 512 and 562 can be used to read data from the other register arrays.

From multiplexers 512 and 562, data is output to parity check modules 514 and 564, respectively. Parity check modules 514 and 564 are configured to perform a parity check such as the parity check described in reference to block 410 in FIG. 4 and to output a signal (e.g., a bit) indicating whether the parity check passes or fails. For example, parity check modules 514 and 564 can be configured to output a 0 if the parity check passes and output a 1 if the parity check fails.

The parity check results from parity check modules 514 and 564 are transmitted to logic gates 518 and 568, respectively. Logic gates 518 and 568 may be configured to receive parity check results from other parity check modules such as from parity check modules 516 and 566, which may generate parity check results for other register arrays. Logic gates 518 and 568 are configured to perform a logic function on the parity check results. For instance, if the parity check modules output a 0 if the parity check passes and output a 1 if the parity check fails, then logic gates 518 and 568 may include an OR gate that outputs a 1 if either one or both of the parity checks fail and that outputs a 0 only if both the parity checks pass.

The logic gates 518 and 568 may be further connected to logic gate 520. Logic gate 520 is configured to compare the results from logic gates 518 and 568 and output an overall result. Accordingly, logic gate 520 computes an overall result for 4 register arrays. The output from logic gate 520 indicates whether any of the 4 register arrays fail the parity check. For instance, continuing with the example used above, logic gate 520 may include an OR gate that outputs a 1 if either one or both of the results from gates 518 and 568 fails and outputs a 0 only if both of the results from gates 518 and 568 pass.

The overall result from gate 520 is optionally stored to a flip-flop 522. For instance, depending upon the configuration used, flip-flop 522 may store a 0 value indicating that all of the parity checks pass and a 1 value indicating that one or more of the parity checks failed, or flip-flop 522 may store a 1 value indicating that all of the parity checks pass and a 0 value indicating that one or more of the parity checks failed. The result from gate 520 can then be read by other downstream circuitry which can log the result, report the result, provide an alert, etc.

It should be noted that the specific examples of network processor online logic tests described in FIGS. 4 and 5 are given merely for illustration purposes only. Embodiments of the disclosure can be applied to any portions of a network processor to perform an online logic test.

Figure 6:
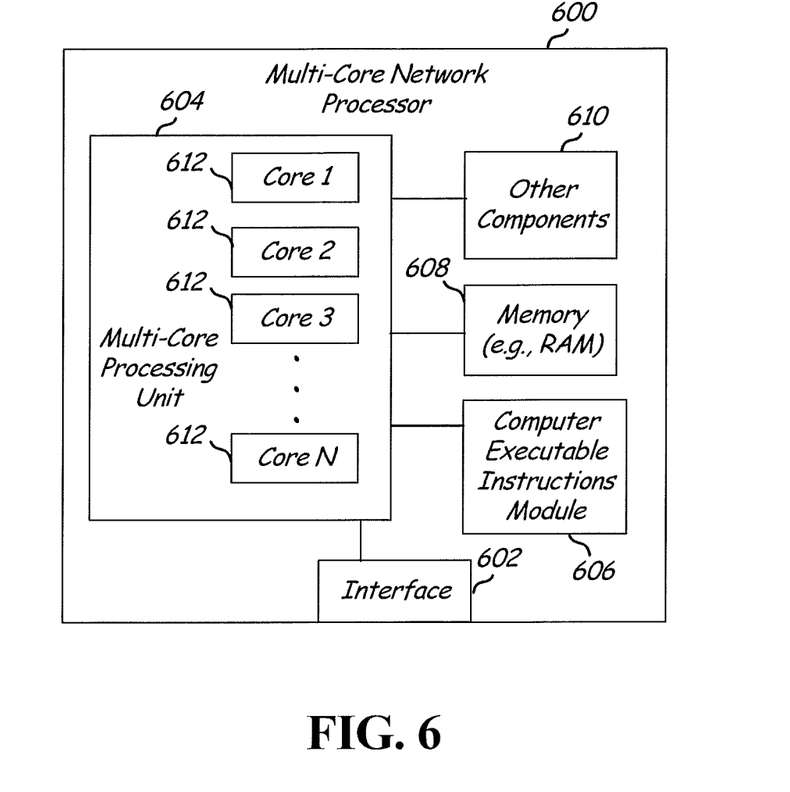
FIG. 6 is a schematic diagram of an embodiment of a network processor.

FIG. 6 illustrates a schematic diagram of a network processor 600 suitable for implementing one or more embodiments of the components and methods disclosed herein. Embodiments are not however limited to any specific implementations and can be used in network processors differing from the specific example shown in the figure.

Network processor 600 includes an interface 602, a multi-core processing unit 604, a computer executable instructions module 606, memory 608, and other components 610. Interface 602 enables network processor 600 to send and receive signals from other components within a board or system that network processor 600 is incorporated within.

Multi-core processing unit 604 includes multiple cores 612 (e.g., cores 1 through N, where N is any number). Each core 612 is able to independently read and execute computer readable instructions, and the multiple cores 612 are able to operate simultaneously. Accordingly, network processor 600 may increase processor performance by being able to read and execute multiple computer readable instructions at the same time. Additionally, each core 612 may include multithreading capabilities, which enable cores 612 to process smaller units of computer readable instructions known as "threads."

Computer executable instructions module 606 includes instructions for performing network processor's 600 operations. For example, computer executable instructions module 606 can include the instructions needed to perform the methods shown in FIGS. 1, 2, and 4.

Memory 608 provides memory (e.g., random access memory) for network processor 600, and other components 610 represent the fact that network processor 600 can have any other desired components as needed to implement any functionality. The simplified network processor 600 shown in FIG. 6 is merely intended to illustrate some general components that may be included in a network processor that implements the testing components and methods described in this disclosure. Embodiments of this disclosure are not limited to any particular network processor configuration and can be implemented in a wide range of settings.

As has been described above, systems and methods are disclosed herein that use an online logic test to test a network processor. Embodiments of the present disclosure may be advantageous in that they enable a network processor to be tested online without impacting the system performance. This is accomplished at least in part by testing each core as it becomes available and is not being used by the system. The online testing can reduce test costs by not requiring any additional equipment for testing (e.g., automatic test equipment). Additionally, the online testing can test portions of a core that may not be fully tested in an offline test (e.g. in an ATPG test), thereby improving test coverage and enhancing the ability to find defects that may affect system performance. Furthermore, since the testing can be performed online, the testing can be periodically repeated to ensure continued correct operation of the network processor and detect potential aging issues that may result in a system failure.

Figure 7:
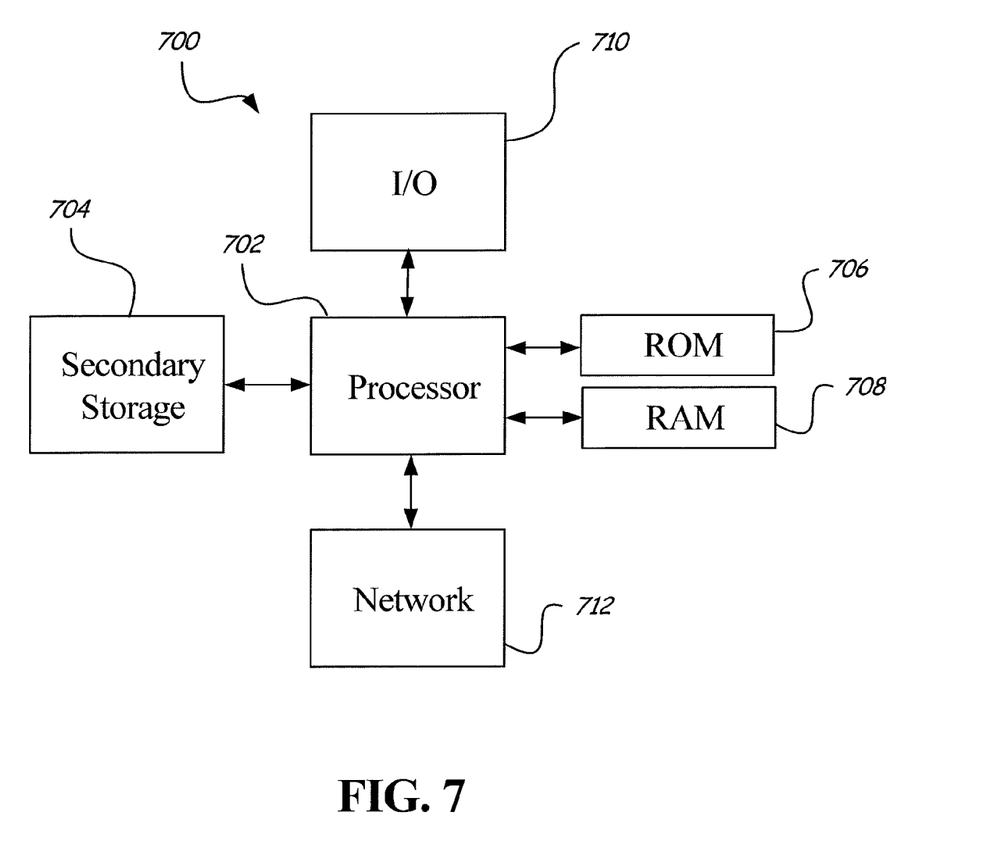
FIG. 7 is a schematic diagram of an embodiment of a general-purpose computer system.

The methods and components (e.g., a network processor) described above may be implemented on any general-purpose network component, such as a computer or network component with sufficient processing power, memory resources, and network throughput capability to handle the necessary workload placed upon it. FIG. 7 illustrates a schematic diagram of a general-purpose network component or computer system 700 suitable for implementing one or more embodiments of the methods or components disclosed herein. The general-purpose network component or computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. Although illustrated as a single processor, the processor 702 is not so limited and may comprise multiple processors. The processor 702 may be implemented as one or more CPU chips, cores (e.g., a multi-core network processor with multithreading), field-programmable gate arrays (FPGAs), application specific integrated circuits (ASICs), and/or digital signal processors (DSPs), and/or may be part of one or more ASICs. The processor 702 may be configured to implement any of the schemes described herein. The processor 702 may be implemented using hardware, software, or both.

The secondary storage 704 is typically comprised of one or more disk drives or tape drives and is used for non-volatile storage of data and as an over-flow data storage device if the RAM 708 is not large enough to hold all working data. The secondary storage 704 may be used to store programs that are loaded into the RAM 708 when such programs are selected for execution. The ROM 706 is used to store instructions and perhaps data that are read during program execution. The ROM 706 is a non-volatile memory device that typically has a small memory capacity relative to the larger memory capacity of the secondary storage 704. The RAM 708 is used to store volatile data and perhaps to store instructions. Access to both the ROM 706 and the RAM 708 is typically faster than to the secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: R=R1+k*(Ru−R1), wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of testing a multi-core network processor comprising:
    placing the multi-core network processor in an online environment;
    detecting, by a scheduler, that a core of the multi-core network processor on a same chip as the scheduler is idle; and
    performing a structural test instead of a thread-based functional test on the core when the core is idle to obtain better defect coverage and test efficiency,
    wherein the core being tested is isolated from other cores during testing so that outputs from the core being tested will not adversely affect a functional status of the other cores,
    wherein the multi-core network processor comprises multithreading capabilities, and
    wherein the core being tested is designated as ready for testing by allocating or migrating a thread in the core to the other cores.

2. The method of claim 1, wherein placing the multi-core network processor in the online environment comprises connecting the multi-core network processor to a functional system and using the multi-core network processor to process data received from the functional system, and wherein the core is released from the structural test and resumes processing data from the functional system when the structural test is completed.

3. The method of claim 1, wherein performing the structural test on the core comprises using a test sequence to detect defects in logic circuitry, read/write circuitry, and a register array of the core.

4. The method of claim 1, further comprising periodically repeating the structural test on the core when the core is idle.

5. The method of claim 1, further comprising performing the structural test on other cores of the multi-core network processor when the other cores are idle.

6. A method of testing a multi-core network processor comprising:
    placing the multi-core network processor in an online environment;
    detecting, by a scheduler, that a core of the multi-core network processor on a same chip as the scheduler is idle; and
    performing a structural test instead of a thread-based functional test on the core when the core is idle to obtain better defect coverage and test efficiency,
    wherein the core being tested is isolated from other cores during testing so that outputs from the core being tested will not adversely affect a functional status of the other cores,
    wherein the multi-core network processor has multithreading capabilities, and
    wherein performing the structural test on the core comprises using an automatic test pattern generation (ATPG) technique.

7. A network processor comprising:
    a computer readable instructions module configured to store test instructions; and a processing core with multithreading capabilities and configured to operate in an online environment and to execute the test instructions to test the processing core using a structural test comprising a Logic Built-In Self-Test (BIST) to obtain better defect coverage and test efficiency relative to a thread-based functional test when a scheduler on a same chip as the processing core determines that the processing core is idle, wherein at least one of the computer readable instructions module and the processing core is implemented in hardware, wherein the core being tested is isolated from other cores during testing so that outputs from the core being tested will not adversely affect a functional status of the other cores, and wherein the core being tested is designated testing by allocating or migrating a thread in the core to the other cores.

8. The network processor of claim 7, wherein the test instructions comprise an indication of a portion of the processing core to be tested.

9. The network processor of claim 7, wherein the test instructions comprise a test sequence used to perform the structural test.

10. The network processor of claim 7, wherein the test instructions comprise an indication of a function used to enable the structural test.

11. The network processor of claim 7, wherein the processing core comprises a register array and read/write circuitry, and wherein the processing core is configured to execute the test instructions to test the register array and the read/write circuitry.

12. The network processor of claim 7, wherein the processing core comprises logic components, and wherein the processing core is configured to execute the test instructions to test the logic components.

13. An apparatus comprising:
a computer executable instructions module configured to store test instructions; and
a multi-core network processor with multithreading capabilities and configured to:
load the test instructions to the multi-core network processor;
operate the multi-core network processor in an online environment;
execute the test instructions to perform a structural test comprising a Logic Built-In Self-Test (LBIST) to obtain better defect coverage and test efficiency relative to a thread-based functional test on a core of the multi-core network processor based at least in part on a determination by a scheduler on a same chip as the core that the core is idle; and
reset the core to the online environment after the structural test has been completed, wherein at least one of the computer executable instructions module and the multi-core network processor is implemented in hardware, wherein the core being tested is isolated from other cores during testing so that outputs from the core being tested will not adversely affect a functional status of the other cores, and wherein performing the structural test on the core comprises using an automatic test pattern generation (ATPG) technique.

14. The apparatus of claim 13, wherein executing the test instructions comprises:
calculating a parity bit for a test sequence;
storing the test sequence and the parity bit to a register array;
reading the test sequence and the parity bit from the register array; and
performing a parity check on the test sequence and the parity bit read from the register array.

15. The apparatus of claim 14, wherein the multi-core network processor is further configured to:
provide an indication that the core is operating correctly based at least in part on a determination that the parity check passes; and
provide an indication that the core is malfunctioning based at least in part on a determination that the parity check fails.

16. The apparatus of claim 13, wherein executing the test instructions comprises testing a functional read/write path of the core.

17. The apparatus of claim 13, wherein executing the test instructions comprises utilizing an idle thread to perform the structural test.

18. The apparatus of claim 13, wherein operating the multi-core network processor in an online environment comprises incorporating the multi-core network processor into a system and operating the system in an operational environment.

19. The apparatus of claim 13, wherein executing the test instructions comprises periodically enabling the structural test when the core is idle.

* * * * *